April 10, 1951     H. N. SIMMS     2,548,744
SAFETY DEVICE

Filed April 30, 1949     2 Sheets-Sheet 1

Inventor
Howard N. Simms
By Fishburn + Mullendore
Attorney

April 10, 1951  H. N. SIMMS  2,548,744
SAFETY DEVICE
Filed April 30, 1949  2 Sheets-Sheet 2
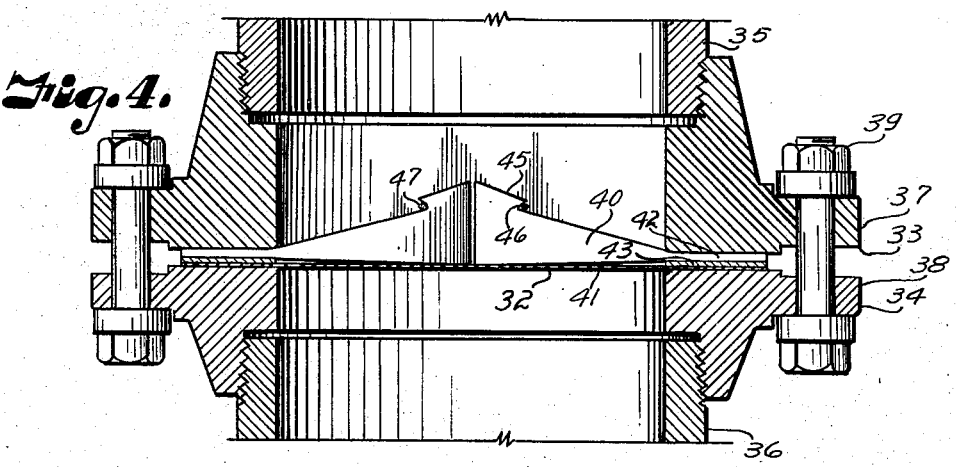
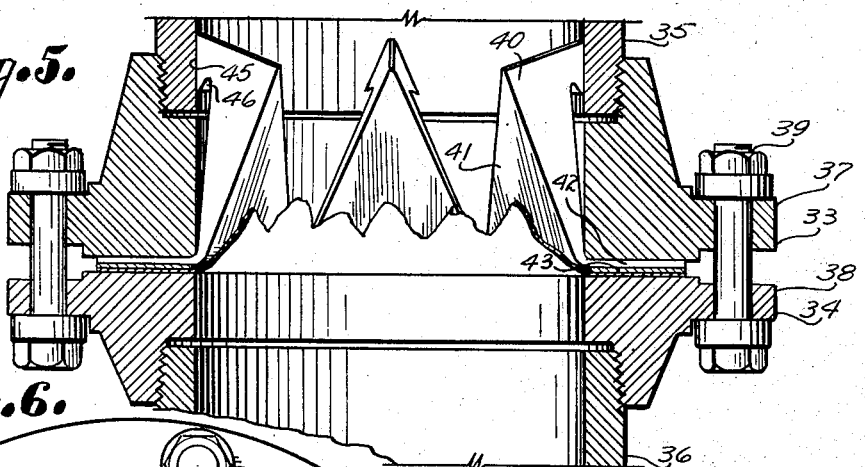
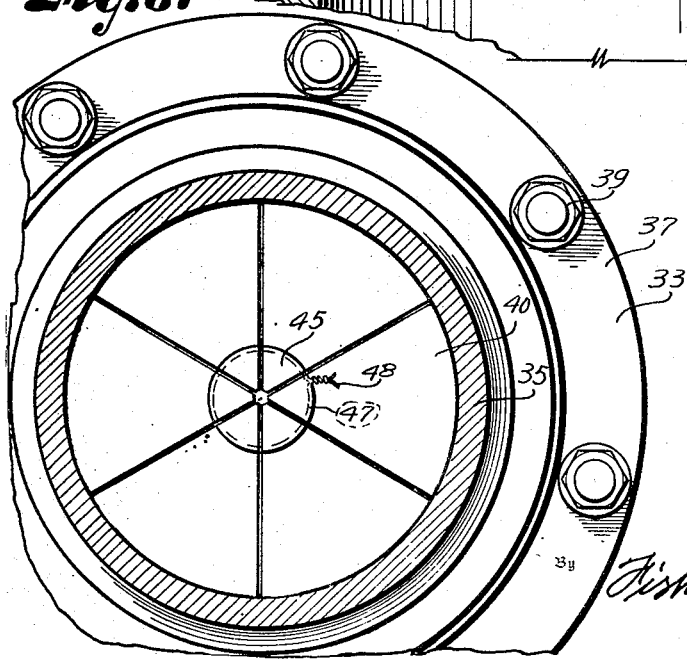
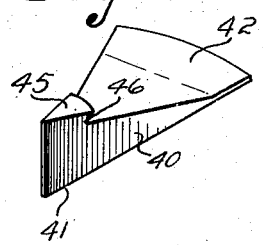
Inventor
Howard N. Simms
By Fishburn & Mullendore
Attorney Patented Apr. 10, 1951

2,548,744

UNITED STATES PATENT OFFICE 2,548,744

SAFETY DEVICE

Howard N. Simms, Independence, Mo., assignor to Black, Sivalls & Bryson, Inc., Kansas City, Mo., a corporation of Delaware Application April 30, 1949, Serial No. 90,733

12 Claims. (Cl. 220—89)

This invention relates to a safety device for protecting vessels, duct systems and other pressure equipment during times that abnormal pressures may occur therein. Most satisfactory devices of this character utilize a frangible diaphragm arranged between the high and low pressure sides of such equipment and which is adapted to rupture when unsafe or predetermined differential pressures arise. However, the specifications for such diaphragms are difficult to calculate because of variation in diaphragm thickness, quality of materials, compound curvatures, and the multiple axial stresses which must be determined.

It is, therefore, the principal object of the present invention to provide a safety device which includes a diaphragm that is not critical as to rupturing pressures in that it merely closes and seals a relief opening in cooperation with a yieldable support that is retained against normal working pressures by an element in tension such as one or more frangible strands adapted to break under a predetermined stress corresponding with the pressure differential at which relief is to be effected. In this way the release of pressure is under control of the strand or wire by which the support element is held in rein. Since wire incidental to its manufacture is substantially uniform in diameter, quality of material and tensile strength, the breaking point is readily determined by an axial pull or by calculation of axial stress in a wire of a given material and treatment. Thus, the pressure release point of such a safety device is easily assured.

The invention also enables selection of the sealing diaphragm solely for its ability to withstand corrosion, temperature and similar factors, while the support therefor and tension elements are selected for strength to withstand the working pressures. Thus, factors which ordinarily affect the strength of the usual frangible diaphragm need not be considered when calculating the differential working and release pressures. Consequently, safety devices may be designed to release pressures very close to the working pressures without danger of alteration in the functioning pressures brought about by weakening of the diaphragm material under service.

Other objects of the invention are to provide a safety device that functions within a close range at low pressure differentials; to provide a safety device wherein the strand controlling the bursting pressure may be heat treated to permit operation under high temperatures as in the protection of refinery stills and the like; to provide a safety device wherein the control element is less affected by fatigue resulting from expansion and contraction of the parts or breathing action of the diaphragm on fluctuable working pressure differentials; to provide a safety device wherein supporting element is securely anchored to the diaphragm clamping means and cannot fly out when the retaining strand breaks apart; and to provide a safety device that may be constructed of materials that are substantially free from corrosion and other deteriorating affects.

It is also an object of the invention to provide a control element for safety devices that may be inspected and the condition thereof readily noted.

In accomplishing these and other objects of the invention hereinafter pointed out, I have provided improved structure, the preferred forms of which are illustrated in the accompanying drawings wherein:

Fig. 4 is a vertical section through a modified form of safety device showing the parts thereof in position for retaining a pressure differential on the respective sides thereof.

Fig. 5 is a similar sectional view showing function of safety device for releasing an abnormal working pressure.

Fig. 6 is a plan view of the safety device illustrated in Fig. 4.

Fig. 7 is a perspective view of one of the retainer segments used in the form of invention illustrated in Fig. 4.

Figure 1:
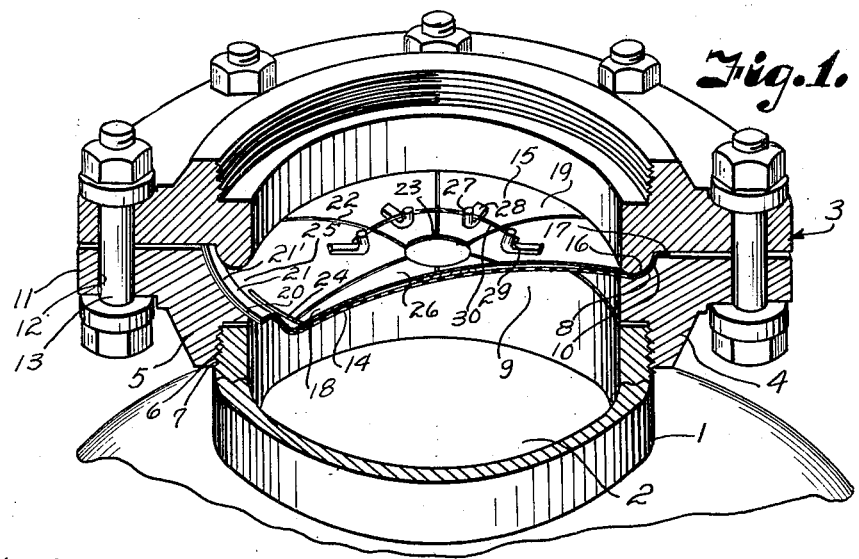
Fig. 1 is a perspective sectional view of a safety device constructed in accordance with the present invention.
Figure 2:
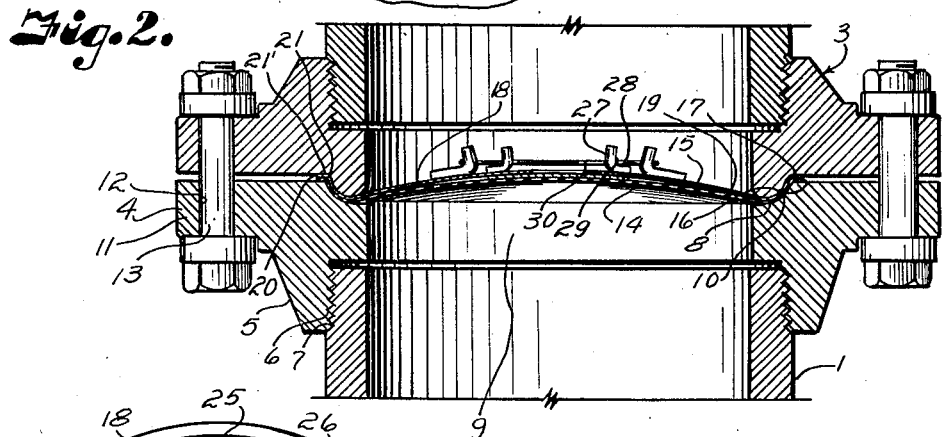
Fig. 2 is a vertical section through the device.
Figure 3:
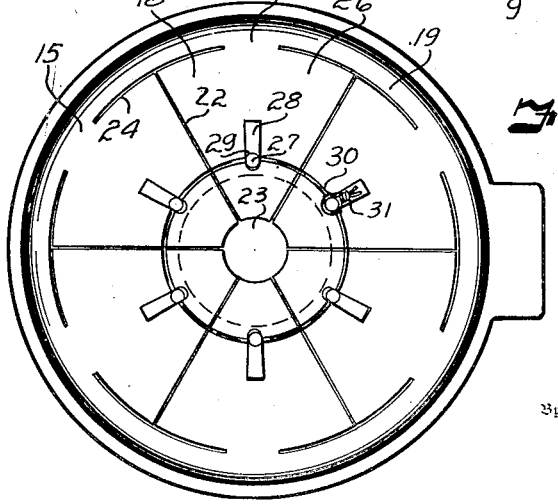
Fig. 3 is a plan view of the pressure release unit.

Referring more in detail to the drawings and first to the form of invention illustrated in Figs. 1 to 3, inclusive:

1 designates a collar which encircles a pressure relief opening 2 in a pressure containing vessel, for example, an oil and gas separator wherein the gas and oil components of the flow from high pressure well are separated. Such vessels are designed to withstand certain working pressures but it may happen that the pressure will rise beyond the safe working pressure for which the vessel was designed and to protect the vessel from bursting, the pressure being quickly relieved through the opening 2 upon operation of a safety device 3 constructed in accordance with the present invention.

In the illustrated instance the safety device includes a ring-shaped body 4 having an annular flange portion 5 provided with internal threads 6 to engage external threads 7 formed on the collar 1. The inner periphery of the ring-like body 4 has a diaphragm seat 8 encircling a central flow opening 9 substantially conforming in diameter to the inner diameter of the collar 1 and which is provided by an annular concave shoulder 10. The ring-like body 4 also includes an outwardly extending annular flange 11 having a series of circumferentially spaced openings 12 through which fastening devices 13 are extended as later described.

The diaphragm 14 is formed of a sheet of material having sufficient strength to be self-supporting across the diameter of the flow opening 9 and is sufficiently fragile to give away under flow of fluid through the flow opening 9 when the pressure exceeds a set amount. The diaphragm may therefore be formed of many materials such as plastic, glass, or various metals, a material being selected best suited to the condition under which the safety device is to operate.

To support the diaphragm and prevent its giving away under lower pressures, it is backed on the low pressure side by a yieldable supporting member 15 later described. The marginal edge 16 of the diaphragm is curved in correspondence to the curvature of the shoulder 8 and terminates in an outwardly extending annular lip 17 that overlies the upper face of the flange 11.

In this form of the invention the supporting member is shown as comprising a disk 18 having a pressure side 19 closely engaging low pressure side of the diaphragm 14. The marginal edge 20 of the supporting or backing member also curves as at 21 and terminates in a lip 21' conforming with the curvature and lip of the marginal portion of the diaphragm. The supporting member is formed of a material having a thickness and tensile strength substantially greater than the diaphragm but the central or body portion thereof is provided with radial slits 22 that extend from a small central opening 23 to connect with transverse arcuate slits 24 that conform in radius to the inner marginal portion of the diaphragm. Thus, the arcuate slits extend transversely of the radial slits and terminate short of each other to provide connections 25 with the segmental portions 26 of the support that are formed between the radial slits. The connecting portions 25 are relatively narrow and constitute bending portions on which the segments are adapted to hinge under flow of pressure fluid through the flow opening 9 as later described.

In order to retain the segment portion 26 in supporting contact with the diaphragm, each segment has fixed thereto near its apex a lug or post 27 having a foot portion 28 suitably attached to the convex sides of the support as best shown in Fig. 1. The posts extending slightly outwardly so as to form seats 29 on the outer sides thereof about which a retaining strand 30 is wrapped in one or more coils depending upon the maximum pressure to be retained in the vessel, the free ends of the strand being secured together by wrapping them around one of the posts and/or twisting the ends together as indicated at 31 (Fig. 3).

The strand is preferably a wire in that it is drawn to accurate size through a die or the equivalent to give uniform tensile strength throughout the length thereof and which readily is determined. Therefore, the size of wire and number of wraps required to provide for release of the diaphragm at a given pressure is readily and accurately determined.

The wire may be formed of one of the non-corrosive metals so that it is not affected by corrosion or it may be protected by a non-corrosive sheathing. When the safety device is used under high temperatures as in connection with refinery vessels and piping, the wire may be heat treated.

Assuming that a safety device constructed and assembled as described is applied to a separator or other pressure vessel, the normal working pressure acts against the diaphragm. The diaphragm is supported by the backing member, the segments of which are secured by the strand or strands of wire that are coiled around the posts or lugs 27. When the pressure tends to rise above the normal working pressure it acts on the underface of the diaphragm and through the diaphragm on the segments of the retaining member so that tension is applied on the coils of the strand.

If the pressure exceeds the strength of the strands, the strands break apart and the diaphragm gives away under folding back of the arcuate segments of the supporting member so as to provide relief through substantially the full flow capacity of the relief opening. The pressure at which the strand breaks is dependent upon the tensile strength and number of strands employed. Thus, a strand was selected that would break within close limits of the desired pressures at which relief was required in protecting the vessel.

The form of the invention illustrated in Figs. 4 to 7, inclusive, employs a substantially flat diaphragm 32 that has its periphery clamped between retaining collars 33 and 34. The collars 33 and 34 are formed to provide connection with pipes or ducts 35 and 36 which contain a pressure differential on the respective sides of the diaphragm. The retaining members have annular flanges 37 and 38 which are secured together and in clamping contact with the diaphragm by fastening devices such as bolts 39.

In this form of the invention the retaining member for the diaphragm constitutes a plurality of separate segmental members 40 as best shown in Fig. 7. The members 40 have faces 41 conforming in shape to the surface of the diaphragm and the outer or wider ends terminate in flat portions 42 that are sufficiently thin to bend upon snapping of the tension element. The flat portions are clamped along with the margin of the diaphragm between the clamping rings, a gasket 43 being inserted between the flat portions 42 and the diaphragm. The segments may increase in thickness toward the center as shown in Fig. 7 and the terminal ends are provided with lugs 45 having undercut grooves 46 on the side thereof adjacent the hook-like flanges 42. The grooves in the segments thus cooperate to form a substantially annular groove in which the rupture strand 47 is wrapped and secured by twisting the ends together as indicated at 48 (Fig. 6).

The flat diaphragm is particularly adapted to low pressure differentials. Should the pressure differential change, for example, by increase of pressure on the diaphragm side, the pressure acts to bulge the diaphragm and move the segments which places the strand or strands 47 in tension. Should the pressure increase beyond the strength of the strands to resist the pressure acting on the diaphragm, the strand gives away to release the segments whereupon the diaphragm fractures and releases the pressure as shown in Fig. 5.

From the foregoing it is obvious that I have provided a safety device wherein the control element is in simple tension and any given material from which it is constructed will have a definite rupture value and service life at a given temperature so that the operating pressure may be readily determined within the close limits.

What I claim and desire to secure by Letters Patent is:

1. A safety device including a yieldable diaphragm for sealing a relief opening through which pressure is adapted to be relieved from a high pressure zone on one side of the diaphragm to a lower pressure zone on the other, and backing means for supporting the diaphragm under normal working pressure differentials including means in contact with the diaphragm and having strand engaging portions, and a frangible strand interconnecting said strand engaging portions and having a tensile strength to retain the contact means in supporting contact with the diaphragm under said working pressure differentials and to give way under a predetermined pressure differential established by the tensile strength of said strand.

2. A safety device including a yieldable diaphram for sealing a relief opening through which pressure is adapted to be relieved from a high pressure zone on one side of the diaphragm to a lower pressure zone on the other, diaphragm backing means having yieldable portions contacting the low pressure side of the diaphragm, and a frangible strand interconnecting said portions to retain said portions in supporting relation with the diaphragm under pressures acting on the high pressure side of the diaphragm up to a predetermined pressure differential controlled by the tensile strength of said strand.

3. A safety device including a diaphragm for sealing a relief opening through which pressure is adapted to be relieved from a high pressure zone on one side of the diaphragm to a lower pressure zone on the other, backing means having yieldable portions contacting the low pressure side of the diaphragm, and a control element tying the yieldable portions together for supporting the diaphragm under pressures acting on the high pressure side of the diaphragm up to a pressure differential established by the tensile strength of said control element.

4. A safety device including a diaphragm for sealing a relief opening through which pressure is adapted to be relieved from a high pressure zone on one side of the diaphragm to a lower pressure zone on the other, backing means having yieldable portions contacting the low pressure side of the diaphragm, strand engaging means on said yieldable portions, and a frangible strand girthing said engaging means to tie the yieldable portions together for supporting the diaphragm under pressures acting on the high pressure side of the diaphragm up to a predetermined pressure differential established by the tensile strength of said strand.

5. A safety device including diaphragm retaining means adapted for encircling a relief opening through which pressure is adapted to be relieved from a high pressure zone to a low pressure zone, a diaphragm bridging said opening and having a marginal portion engaged between the retaining means to seal the opening, backing means carried by the retaining means on the low pressure side of the diaphragm and having yieldable portions contacting said side of the diaphragm, and a control member having an established tensile strength and interconnecting said portions to retain said portions in support with the diaphragm under pressures acting on the high pressure side up to a predetermined pressure differential established by the tensile strength of said control member.

6. A safety device including diaphragm clamping members adapted for encircling a relief opening through which pressure is adapted to be relieved from a high pressure zone to a low pressure zone, a diaphragm bridging said opening and having a marginal portion engaged between the clamping members to seal the opening, a backing member conforming in shape with the diaphragm and having yieldable portions engaging the diaphragm, and a frangible control element having an established tensile strength and interconnecting said portions to retain said portions in support with the diaphragm under pressures acting on the high pressure side up to a pressure differential established by the tensile strength of said strand.

7. A safety device including diaphragm clamping members adapted for encircling a relief opening through which pressure is adapted to be relieved from a high pressure zone to a low pressure zone on the other, a diaphragm having a marginal portion engaged between the clamping members for closing said opening, a diaphragm supporting means including a plurality of segments engaging the diaphragm on the low pressure side, means hingingly connecting the segments with said clamping members for retention thereby, and a frangible strand interconnecting said segments in supporting contact with the diaphragm under predetermined working pressures acting on the high pressure side and adapted to fracture when the pressure differential acting on the diaphragm reaches a predetermined differential established by the tensile strength of the strand.

8. A safety device including diaphragm clamping members adapted for encircling a relief opening through which pressure is adapted to be relieved from a high pressure zone to a low pressure zone on the other, a diaphragm having a marginal portion engaged between the clamping members for closing said opening, a diaphragm supporting means including a plurality of segments engaging the diaphragm on the low pressure side, means hingingly connecting the segments with said clamping members for retention thereby, strand engaging lugs on the segments, and a frangible strand encircling the lugs to retain said segments in supporting contact with the diaphragm under predetermined working pressures acting on the high pressure side and adapted to fracture when the pressure differential acting on the respective sides of the diaphragm reaches a predetermined differential established by the tensile strength of the strand.

9. A safety device including diaphragm clamping members adapted for encircling a relief opening through which pressure is adapted to be relieved from a high pressure zone to a low pressure zone, a diaphragm bridging said opening and having a marginal portion engaged between the clamping member to seal the opening, a backing member conforming in shape with the diaphragm and having radial slits to provide yieldable segments engaging the diaphragm, and a frangible element interconnecting said segments to retain said yielding portions in support with the diaphragm under pressures acting on the high pressure side up to a pressure differential established by the tensile strength of said element.

10. A safety device including diaphragm clamping members adapted for encircling a relief opening through which pressure is adapted to be relieved from a high pressure to a low pressure, a concavo-convex diaphragm bridging said opening and having a marginal portion engaged between the clamping member to seal the opening, backing means carried by the clamping member on the convex side of the diaphragm and having yieldable portions contacting said side of the diaphragm, and a frangible element interconnecting said portions to retain said yielding portions in support with the diaphragm.

11. A safety device including diaphragm clamping members adapted for encircling a relief opening through which pressure is adapted to be relieved from a high pressure to a low pressure; a concavo-convex diaphragm bridging said opening and having a marginal portion engaged between the clamping member to seal the opening, a similar shaped backing member carried by the clamping member on the convex side of the diaphragm and closely fitting the diaphragm, said backing member having radial slits extending from near the center outwardly to connect with arcuate slits near the periphery of the diaphragm to provide yieldable segments, and a frangible element interconnecting said segments to retain said segments in support with the diaphragm and to release said segments under a predetermined pressure on said diaphragm.

12. A safety device including a diaphragm for closing a flow opening, diaphragm supporting means including a plurality of segments engaging the diaphragm on one side, means for securing the diaphragm and anchoring said segments at the periphery of the diaphragm, and strand having a predetermined tensile strength interconnecting said segments near the center of the diaphragm to retain said segments in supporting contact with the diaphragm under predetermined working pressures and adapted to fracture for releasing the pressure acting on the segments when pressure reaches a pressure established by the strength of the strand.

HOWARD N. SIMMS.

REFERENCES CITED

The following references are of record in the file of this patent:

UNITED STATES PATENTS

| Number | Name | Date |
|---|---|---|
| 2,478,958 | Wheeler et al. | Aug. 16, 1949 |